(12) United States Patent
Chang

(10) Patent No.: US 9,344,692 B2
(45) Date of Patent: May 17, 2016

(54) PROJECTOR USING ONE COMMON LIQUID CRYSTAL UNIT TO LOAD IMAGE INFORMATION ON LIGHT RAYS

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 148 days.

(21) Appl. No.: 14/135,477

(22) Filed: Dec. 19, 2013

(65) Prior Publication Data

US 2015/0062539 A1 Mar. 5, 2015

(30) Foreign Application Priority Data

Sep. 4, 2013 (CN) .......................... 2013 1 0396049

(51) Int. Cl.
*G03B 21/00* (2006.01)
*H04N 9/31* (2006.01)

(52) U.S. Cl.
CPC ........... *H04N 9/3108* (2013.01); *H04N 9/3164* (2013.01)

(58) Field of Classification Search
CPC ........... G03B 21/20; G03B 21/00; H04N 9/31
See application file for complete search history.

(56) References Cited

U.S. PATENT DOCUMENTS

| 5,805,244 A * | 9/1998 | Suh .................................. 349/7 |
| 2009/0153977 A1 * | 6/2009 | Chen et al. .................... 359/634 |

\* cited by examiner

*Primary Examiner* — Sultan Chowdhury
*Assistant Examiner* — Danell L Owens
(74) *Attorney, Agent, or Firm* — Novak Druce Connolly Bove + Quigg LLP

(57) ABSTRACT

A projector includes a light source module, a collimation element, a liquid crystal unit, and a combination element. The light source module includes a red light source, a green light source, and a blue light source. The collimation element includes an optical portion, the optical portion includes three collimation lenses aligned with the red light source, the green light source, and the blue light source respectively. The liquid crystal unit includes three information-loading areas aligned with the three collimation lenses respectively. The combination element includes three parallel reflecting surfaces, the three reflecting surfaces incline 45 degrees toward the liquid crystal unit, and are aligned the three information-loading areas respectively.

8 Claims, 2 Drawing Sheets

PROJECTOR USING ONE COMMON LIQUID CRYSTAL UNIT TO LOAD IMAGE INFORMATION ON LIGHT RAYS

BACKGROUND

1. Technical Field

The present disclosure relates to projectors, and particularly to a projector using one common liquid crystal unit to load image information on light rays penetrating the liquid crystal unit.

2. Description of Related Art

Projectors generally include three different light sources, three collimation elements, three liquid crystal units, and a light combination element. Each light source aligns with one collimation element and one liquid crystal unit. Light rays emitted from the light source pass through the collimation element and the liquid crystal unit, and project on the light combination element. The light combination element combines the light rays penetrating the three liquid crystal units to mix light rays. However, if any pair of the light source, the collimation element, and the liquid crystal unit is unaligned, an image formed by the mixed light rays will be blurred, which deteriorates a quality of the images.

Therefore, it is desirable to provide a projector that can overcome the limitations described.

DETAILED DESCRIPTION

Embodiments of the disclosure will be described with reference to the drawings.

Figure 1:
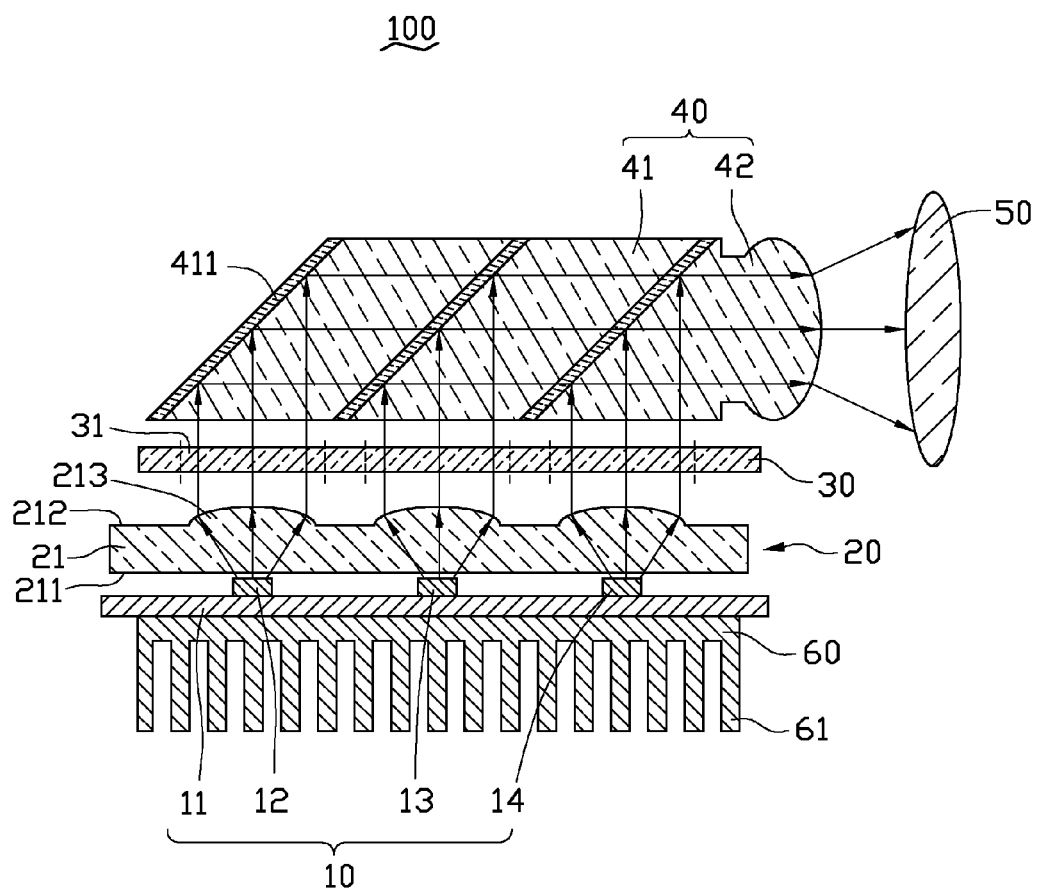
FIG. 1 is a cross-sectional view of a projector in accordance with a first exemplary embodiment.

FIG. 1 shows a projector 100, according to a first exemplary embodiment. The projector 100 includes a light source module 10, a collimation element 20, a liquid crystal unit 30, a combination element 40, a projection lens 50, and a dissipation module 60. In the embodiment, the projector 100 is an LCD projector.

The light source module 10 includes a circuit board 11, a red light source 12, a green light source 13, and a blue light source 14. The red light source 12, the green light source 13, and the blue light source 14 are electrically positioned on the circuit board 11, and array in a line. The circuit board 11 is a heat conduction board, and heat generated by the red light source 12, the green light source 13, and the blue light source 14 is conducted to the circuit board 11. The red light source 12, the green light source 13, and the blue light source 14 emit red light rays, green light rays, and blue light rays respectively.

The collimation element 20 includes an optical portion 21. The optical portion 21 is integral injected, and includes an incident surface 211 and an emergent surface 212 opposite to the incident surface 211. The incident surface 211 faces the light source module 10, and light rays emitted from the light source module 10 project on the incident surface 211. Three collimation lenses 213 protrude from the emergent surface 212. The three collimation lenses 213 array in a line, and align with the red light source 12, the green light source 13, and the blue light source 14 respectively.

The liquid crystal unit 30 is positioned on a side of the collimation element 20, and facing away from the light source module 10. The emergent surface 212 of the collimation element 20 faces the liquid crystal unit 30. The liquid crystal unit 30 is an integrated liquid crystal, and includes three information-loading areas 31. The three information-loading areas 31 array in a line, and align with the three collimation lenses 213 respectively. An optical axis of each collimation lens 213 is perpendicular to the liquid crystal unit 30. The three information-loading areas 31 are respectively used for loading images information on the red light rays, the green light rays, and the blue light rays.

The combination element 40 is positioned at a side of the liquid crystal unit 30, and facing away from the collimation element 20. The combination element 40 includes a reflecting portion 41 and a diverging lens 42 integrally formed with the reflecting portion 41. The reflecting portion 41 includes three parallel reflecting surfaces 411. The three reflecting surfaces 411 incline 45 degrees toward the liquid crystal unit 30 respectively, and face the three information-loading areas 31 respectively. One reflecting surface 411 reflects the red light rays, one reflecting surface 411 reflects the green light rays and penetrates the red light rays, and the other reflecting surface 411 reflects the blue light rays and penetrates the red light rays and the green light rays. An optical axis of the diverging lens 42 is perpendicular to an optical axis of any collimation lens 213. The red light rays, the green light rays, and the blue light rays are mixed before reflecting to the diverging lens 42. The mixed light rays penetrate the diverging lens 42 and are diverged by the diverging lens 42.

In the embodiment, the red light source 12 faces the reflecting surface 411 reflecting the red light rays, the green light source 13 faces the reflecting surface 411 reflecting the green light rays, and the blue light source 14 faces the reflecting surface 411 reflecting the blue light rays.

The projection lens 50 is positioned at a side of the diverging lens 42, and facing away from the reflecting portion 41. An optical axis of the projection lens 50 is collinear with an optical axis of the diverging lens 42. The projection lens 50 is configured for correcting light rays penetrating the diverging lens 42.

The dissipation module 60 includes a number of dissipation pins 61. The dissipation pins 61 are parallelly positioned on a side of the circuit board 11, and facing away from the collimation element 20. The dissipation module 60 is configured for dissipating heat of the circuit board 11.

In use, the red light rays emitted from the red light source 12, the green light rays emitted from the green light source 13, and the blue light rays emitted from the blue light source 14 are projected to the three collimation lens 213 of the collimation element 20 respectively. The red light rays, the green light rays, and the blue light rays penetrate the collimation lens 213, and are converged to parallel light rays. The red light rays, the green light rays, and the blue light rays emit from the collimation lens 213 and project to the three information-loading areas 31. The red light rays, the green light rays, and the blue light rays are loaded images information by the information-loading areas 31. The red light rays project on the reflecting surface 411 reflecting the red light rays, the green light rays project on the reflecting surface 411 reflecting the green light rays, and the blue light rays project on the reflecting surface 11 reflecting the blue light rays. The red light rays, the green light rays, and the blue light ray are mixed to a beam of mixed light rays by the reflecting portion 41, and the mixed light rays is diverged to the projection lens 50 by the diverging lens 42.

Figure 2:
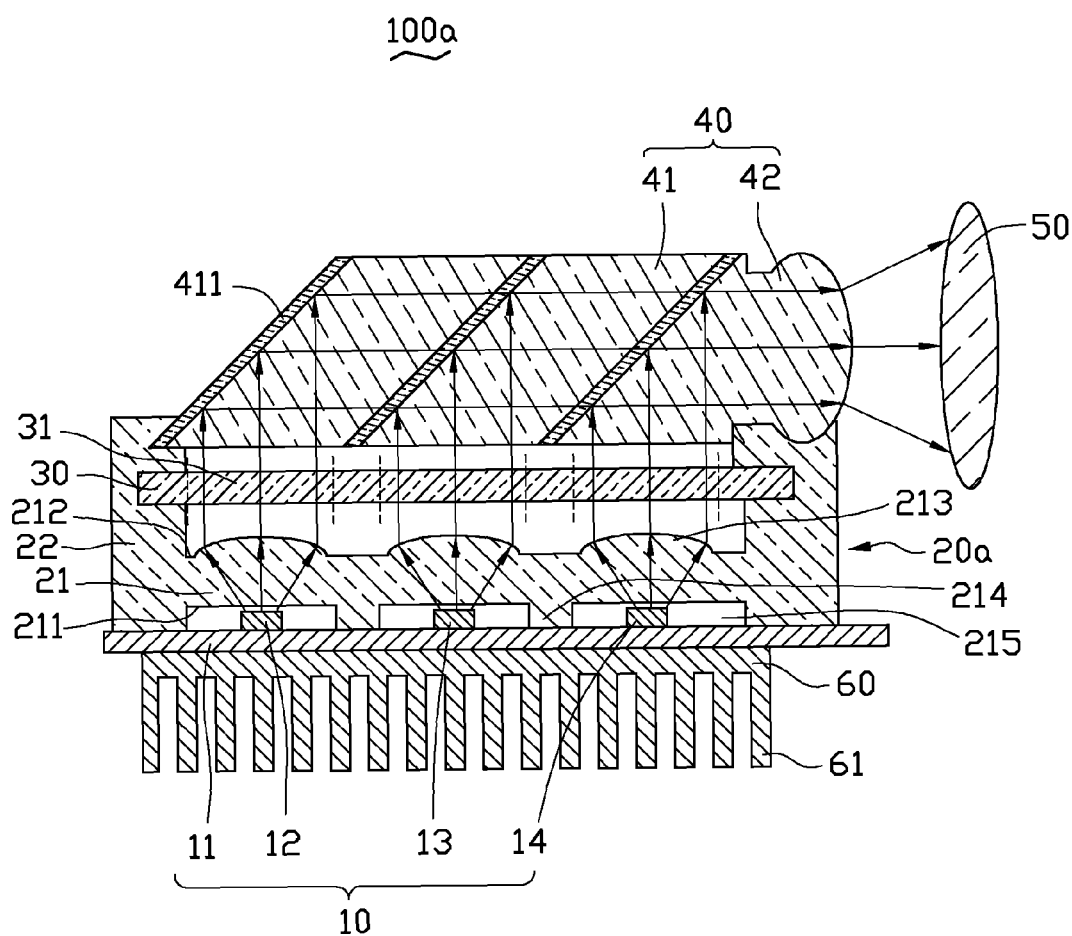
FIG. 2 is a cross-sectional view of a projector in accordance with a second exemplary embodiment.

FIG. 2 shows a projector 100a, according to a second exemplary embodiment. The difference between the projector 100a of the second exemplary embodiment and the projector 100 of the first exemplary embodiment is that the projector 100a includes a collimation element 20a. The collimation element 20a includes two supporting arms 22, and the optical portion 21 is connected between the two supporting arms 22. The supporting arms 22 are positioned on the circuit board 11. The liquid crystal unit 30 is supported between the two supporting arms 22. The combination element 40 is supported on the supporting arms 22. Two spacers 214 extend downward from the incident surface 211 of the optical portion. The two spacers 214 are positioned between the two supporting arms 22, and form three receiving recesses 215 with the supporting arms 22. The red light source 12, the green light source 13, and the blue light source 14 are received in the receiving recesses 215 respectively. As the optical portion 21, the liquid crystal unit 30, and the combination element 40 are fixed on the supporting arms 22, the alignment accuracy of assemblies of the projector 100a is increased.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A projector, comprising:
   a light source module comprising a red light source, a green light source, and a blue light source; the red light source for emitting red light rays, the green light source for emitting green light rays, and the blue light source for emitting blue light rays;
   a collimation element comprising an optical portion, the optical portion comprising three collimation lenses aligned with the red light source, the green light source, and the blue light source respectively; the red light rays, the green light rays, and the blue light rays converged to parallel light rays by the collimation lenses;
   a liquid crystal unit comprising three information-loading areas aligned with the three collimation lenses respectively; the information-loading areas loading images information on the red light rays, the green light rays, and the blue light; and
   a combination element comprising three paralleled reflecting surfaces, the three reflecting surfaces inclining 45 degrees toward the liquid crystal unit and aligned with the three information-loading areas respectively; the reflecting surfaces mixing the red light rays, the green light rays, and the blue light to a beam of mixed light rays;
   wherein the light source module further comprises a circuit board, the red light source, the green light source, and the blue light source are electrically positioned on the circuit board, and arrayed in a line, the collimation element further comprises two supporting arms, the optical portion is connected between the two supporting arms and the two supporting arms are positioned on the circuit board.

2. The projector of claim 1, wherein the optical portion comprises an incident surface and an emergent surface opposite to the incident surface, the light source module faces the incident surface, the collimation lenses protrude from the emergent surface.

3. The projector of claim 2, wherein the collimation element comprises two spacers extending downward from the incident surface of the optical portion, the two spacers are positioned between the two supporting arms, and form three receiving recesses with the supporting arm; the red light source, the green light source, and the blue light source are received in the receiving recesses respectively.

4. The projector of claim 1, wherein the liquid crystal unit is supported between the two supporting arms, and an optical axis of each collimation lens is perpendicular to the liquid crystal unit.

5. The projector of claim 1, wherein the combination element is supported between the two supporting arms.

6. The projector of claim 5, wherein the combination element comprises a reflecting portion and a diverging lens integrally formed with the reflecting portion, the three reflecting surfaces are formed in the reflecting portion, the reflecting surfaces reflect the light rays to the diverging lens.

7. The projector of claim 6, wherein one reflecting surface reflects the red light rays, one reflecting surface reflects the green light rays and penetrates the red light rays, and the other reflecting surface reflects the blue light rays and penetrates the red light rays and the green light rays.

8. The projector of claim 1, further comprising a dissipation module, wherein the circuit board is a heat conduction board, the dissipation module is positioned at a side of the circuit board facing away from the collimation element.

* * * * *